(12) United States Patent
Hoogzaad et al.

(10) Patent No.: US 11,923,877 B2
(45) Date of Patent: Mar. 5, 2024

(54) ANTENNA SWITCH CIRCUIT AND METHOD

(71) Applicant: NXP B.V., Eindhoven (NL)

(72) Inventors: Gian Hoogzaad, Mook (NL); Jozef Reinerus Maria Bergervoet, Eindhoven (NL); Alexander Simin, Nijmegen (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 17/660,392

(22) Filed: Apr. 22, 2022

(65) Prior Publication Data

US 2022/0352908 A1    Nov. 3, 2022

(30) Foreign Application Priority Data

Apr. 30, 2021  (EP) ..................................... 21171588

(51) Int. Cl.
| | | |
|---|---|---|
| *H04B 1/44* | (2006.01) | |
| *H04B 1/00* | (2006.01) | |
| *H04B 1/16* | (2006.01) | |
| *H04B 7/06* | (2006.01) | |

(52) U.S. Cl.
CPC ............. *H04B 1/006* (2013.01); *H04B 1/163* (2013.01); *H04B 1/44* (2013.01); *H04B 7/0602* (2013.01)

(58) Field of Classification Search
CPC ........ H04B 1/006; H04B 7/04; H04B 7/0602; H04B 1/44; H04B 1/163; H04B 5/0075; H04B 5/02; H04B 5/0012
See application file for complete search history.

(56) References Cited

U.S. PATENT DOCUMENTS

| | | | |
|---|---|---|---|
| 8,165,535 B2 * | 4/2012 | Ahn .......................... | H04B 1/48 343/876 |
| 8,649,740 B2 | 2/2014 | Lin et al. | |
| 9,479,160 B2 | 10/2016 | Srihari et al. | |
| 10,797,694 B2 | 10/2020 | Burgener et al. | |
| 11,349,469 B2 * | 5/2022 | Atesal ................. | H03K 17/102 |
| 2020/0220568 A1 * | 7/2020 | Watanabe ................ | H03F 3/72 |
| 2022/0345103 A1 * | 10/2022 | Guo ..................... | H04B 1/0458 |

* cited by examiner

*Primary Examiner* — Tuan Pham (57) ABSTRACT

An antenna switch circuit and an antenna circuit switching method. The circuit includes an antenna port, a termination port (e.g., for disposal of power reflected back from an antenna and received through the antenna port in a transmit mode), and a receive port (e.g., for receiving a signal from the antenna port via the antenna switch circuit in a receive mode). The circuit also includes a first switch coupled between the antenna port and the termination port. The circuit further includes a resonant inductance coupled between the receive port and the node located between the antenna port and the first switch. The circuit also includes a second switch coupled between a reference potential and a node located between the resonant inductance and the receive port.

15 Claims, 5 Drawing Sheets

ANTENNA SWITCH CIRCUIT AND METHOD

CROSS-REFERENCE TO RELATED APPLICATION

This application claims the priority under 35 U.S.C. § 119 of European patent application no. 21171588.3, filed Apr. 30, 2021 the contents of which are incorporated by reference herein.

BACKGROUND

The present specification relates to an antenna switch circuit, to an integrated circuit including the antenna switch circuit, to a front end module including the antenna switch circuit, to a base station or wireless local area network, "WLAN", device including the front end module, and to an antenna circuit switching method.

Antenna switch topologies in wireless base-station applications are typically Single Pole Double Throw (SPDT) topologies which use four switches. The switches themselves may be implemented using Metal Insulator Semiconductor Field Effect Transistors (MISFETs), e.g., in Silicon On Insulator (SOI) technology.

Figure 1:
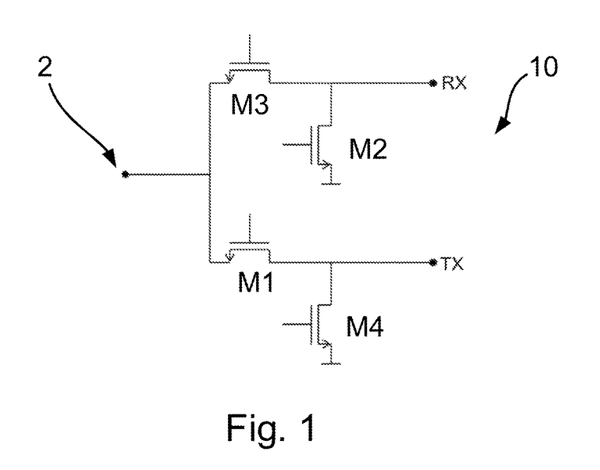
FIG. 1 shows an antenna switch circuit.

An example of such a circuit topology is shown in FIG. 1. The circuit 10 includes a port 2 leading to/from an antenna. The circuit also includes an RX port (RX) for routing a signal received from the antenna port 2 through a front end module (e.g., of a base station) and a termination port (TX). As will be described below in relation to FIG. 2, the termination port allows for disposal of power reflected back from the antenna during a transmit mode of the circuit.

The circuit 10 further includes an arrangement of switches (typically MOSFETs, as noted above) including switches M1, M2, M3, M4. Switch M1 is coupled in series between the antenna port 2 and the TX port. Switch M3 is coupled in series between the antenna port 2 and the RX port. Switch M2 is coupled in between ground and a node located between the RX port and switch M3. Switch M4 is coupled in between ground and a node located between the TX port and switch M1.

The circuit has a transmit mode and a receive mode. In the transmit mode, switches M1 and M2 are on, while switches M3 and M4 are off. In the receive mode, switches M1 and M2 are off, while switches M3 and M4 are on.

In the transmit mode, there may be a high signal power passing through the antenna port 2 and the TX port (e.g., 47 dBm peak=50 W=71V peak at 50Ω). Switches M3 and M4 need to withstand this voltage across their terminals, and hence require high breakdown capabilities.

In the receive mode, the power levels may not be critical for the switches, but noise characteristics of the circuit nevertheless are important.

As a consequence, the performance of the circuit 10 in terms of its power handling and noise characteristics is limited by the circuit topology.

SUMMARY

Aspects of the present disclosure are set out in the accompanying independent and dependent claims. Combinations of features from the dependent claims may be combined with features of the independent claims as appropriate and not merely as explicitly set out in the claims.

According to an aspect of the present disclosure, there is provided an antenna switch circuit comprising:
an antenna port;
a termination port;
a receive port;
a first switch coupled between the antenna port and the termination port;
a resonant inductance coupled between the receive port and the node located between the antenna port and the first switch; and
a second switch coupled between a reference potential and a node located between the resonant inductance and the receive port,
wherein the antenna switch circuit is switchable between:
a transmit mode in which both the first switch and the second switch are in an on state; and
a receive mode in which both the first switch and the second switch are in an off state.

In some embodiments, the termination port is for disposal of power reflected back from an antenna and received through the antenna port in a transmit mode. In some embodiments, the receive port is for receiving a signal from the antenna port via the antenna switch circuit in a receive mode.

The first switch may be located in a first semiconductor die and the second switch may be located in a second semiconductor die. The first semiconductor die may be electrically connected to the second semiconductor die by an interconnect. Inductance may be a partial inductance of the interconnect. The interconnect may be one or more bond wires or a laminate track. The second semiconductor die may include an amplification stage. An input of the amplification stage may be coupled to the node located between the inductance and the receive port. An output of the amplification stage may be coupled to the receive port.

The first switch and the second switch may both be located on a first semiconductor die. The inductance may be the inductance of a bond wire, or of a laminate track or a planar coil formed on a surface of the first semiconductor die. The antenna switch circuit may comprise a second semiconductor die comprising an amplification stage. An input of the amplification stage may be coupled to the node located between the inductance and the receive port. An output of the amplification stage may be coupled to the receive port. Alternatively, the first semiconductor die may further comprise an amplification stage. An input of the amplification stage may be coupled to the node located between the inductance and the receive port. An output of the amplification stage may be coupled to the receive port.

The antenna switch circuit may further comprise a series coupled capacitance and third switch. The series coupled capacitance and third switch may be coupled in parallel with the resonant inductance. In the transmit mode the third switch may be switched to an on state. In the receive mode the third switch may be switched to an off state. The capacitance may be programmable.

The antenna switch circuit may further comprise an inductance coupled in parallel with the first switch. The antenna switch circuit may further comprise an inductance coupled between a reference potential and a node located between the termination port and the first switch.

Each switch may comprise a Metal Insulator Semiconductor Field Effect Transistor (MISFET). Each MISFET may be implemented using Silicon on Insulator (SOI) technology. Each MISFET may, for instance, be a Metal Oxide Semiconductor Field Effect Transistor (MOSFET).

According to another aspect of the present disclosure, there is provided a front end module comprising an antenna switch circuit of the kind set out above.

According to a further aspect of the present disclosure, there is provided a base station comprising a front end module of the kind set out above.

According to another aspect of the present disclosure, there is provided a wireless local area network, "WLAN", device comprising a front end module of the kind set out above.

According to a further aspect of the present disclosure, there is provided an antenna circuit switching method comprising:
  providing an antenna switch circuit of the kind set out above; and
  switching the antenna switch circuit between the transmit mode and the receive mode.

BRIEF DESCRIPTION OF THE DRAWINGS

Embodiments of this disclosure will be described hereinafter, by way of example only, with reference to the accompanying drawings in which like reference signs relate to like elements and in which.

DETAILED DESCRIPTION

Embodiments of this disclosure are described in the following with reference to the accompanying drawings.

Figure 2:
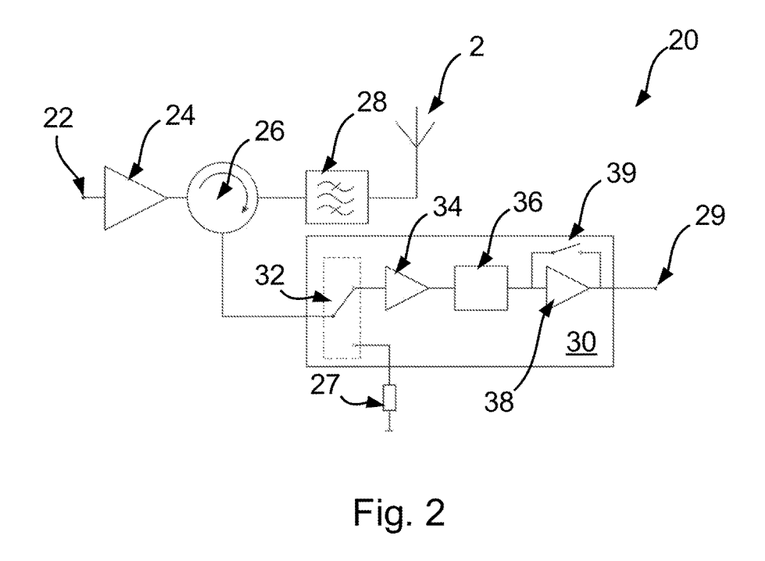
FIG. 2 shows a system including a front end module according to an embodiment of this disclosure.

FIG. 2 shows a system 20 including a front end module 30 according to an embodiment of this disclosure. The system 20 may, for instance be for implementing a channel in a (e.g., 5G) multi-channel base-station.

The system includes a transmit port 22, a receive port 29, a power amplifier 24, a circulator 26, a filter 28, an antenna 2, the aforementioned front end module 30 and a resistor 27, which is coupled between the front end module 30 and a reference voltage (e.g., ground). An input of the power amplifier 24 is coupled to the transmit port 22. An output of the power amplifier 24 is coupled to an input of the circulator 26. A first output of the circulator 26 is coupled to the front end module as described below. A second output of the circulator 26 is coupled to the filter 28. An output of the filter 28 is coupled to the antenna 2.

The front end module 30 in this embodiment includes an antenna switch circuit 32, a first low noise amplifier 34, a digital step attenuator 36, and a second low noise amplifier 38. The antenna switch circuit 32 has an input coupled to the circulator 26. The antenna switch circuit 32 is switchable between two outputs. A first of the outputs, which may correspond to a TX port of the kind described above in relation to FIG. 1, is coupled to the resistor 27 (e.g., 50Ω) and a second of the outputs is coupled to an input of the first low noise amplifier 34. The resistor 27 may be a discrete component. An output of the first low noise amplifier is coupled to an input of the digital step attenuator 36. An output of the digital step attenuator 36 is coupled to an input of the second low noise amplifier 38. An output of the second low noise amplifier 38 is coupled to the receive port 29. The second low noise amplifier is provided with a bypass switch 39, which is coupled in parallel with the second low noise amplifier 38.

In a transmit mode, the power amplifier 24 is switched on, and delivers power to the circulator 26 based on a signal for transmission received at the transmit port 22 (e.g., in one implementation, 8 W=39 dBm of maximum average power with peaks at 50 W=47 dB may be provided at the output of the power amplifier 24). The circulator 26 directs this power through the filter 28 to the antenna 2. Due to antenna mismatch part (or all) of this power may be reflected back through the system 20. At least part (typically most or all) of this reflected antenna transmit power may be directed by the circulator 26 to the front end module 30. In order to prevent the reflected power from damaging the power amplifier 24, or the components of the front end module 30 and/or any components located downstream of the receive port 29, the antenna switch circuit 32 is switchable to direct the reflected power through the (e.g., through the TX port of FIG. 1) to the resistor 27.

In a receive mode, power received at the antenna 2 is directed by the circulator 26 to the front end module 30. In the receive mode, the antenna switch circuit 32 is switchable to direct the received power through the first low noise amplifier 34, the digital step attenuator 36 and the second low noise amplifier 38, thereby to provide an amplified receive signal to the receive port 29. In some embodiments, the gain provided by the low noise amplifiers 34, 38 may be programmable. The bypass switch 39 may constitute one such way of adjusting the gain, since closing of the bypass switch 39 may effectively remove the second low noise amplifier 38 from the signal path, whereby only the first low noise amplifier 34 contributes to the gain provided by the front end module 30. The digital step attenuator 36 may constitute another way of adjusting the gain. The digital step attenuator 36 may attenuate the signal according to the required gain. Note that it is envisaged that the digital step attenuator 36, the bypass switch and also the second low noise amplifier 38 may be considered to be optional, according to the level of gain adjustability required according to a given application of the front end module 30.

Conventionally, it will be appreciated that the antenna switch circuit 32 may be implemented using a circuit 10 of the kind described above in relation to FIG. 1.

However, this arrangement would suffer from a number of problems.

For instance, the switch M3 of the circuit 10 would, in its off state (i.e., in transmit mode), need to withstand the large transmit power across its terminals. Accordingly, a switch having high breakdown characteristics would be required. This may generally require the switch M3 to be implemented using multiple transistors stacked in series, each transistor individually having relatively a relatively high breakdown voltage (for example, as many as fifteen transistors, each having a 5V breakdown voltage).

Another problem would be that in the on state of the switch M3 (i.e., in receive mode), the on state resistance of the switch M3 should be relatively small (in some embodiments as small as possible), so as not to introduce unwanted noise into a signal received at the antenna port 2. This may require that large transistors may need to be used to implement the switch M3 (for example 6 mm total finger-width per switch transistor).

Both of the factors noted above tend to increase the physical size of the circuitry and components used to implement the switch M3. This can make driving the transistors of the switch M3 difficult, whereby to achieve a fast switching time (e.g., to switch between an on state and off state (or vice versa) of M3 in 0.5 µs) the size of the driver and its associated charge pump may also need to be increased. Again, this increases the size of the overall circuit. This increased size of the circuit can increase costs and also increase parasitics within the circuit, which could adversely affect a balancing network that secures the power handling capability. Increased noise may also be induced or picked up, or routing could become unpractical.

A further problem is that the issues mentioned above may limit the technologies usable to implement the circuit. For instance, stacking transistors in the manner described above may require the use of Silicon on Insulator (SOI) technology (for its high isolation and breakdown characteristics), which is generally more expensive than bulk technologies.

Figure 3:
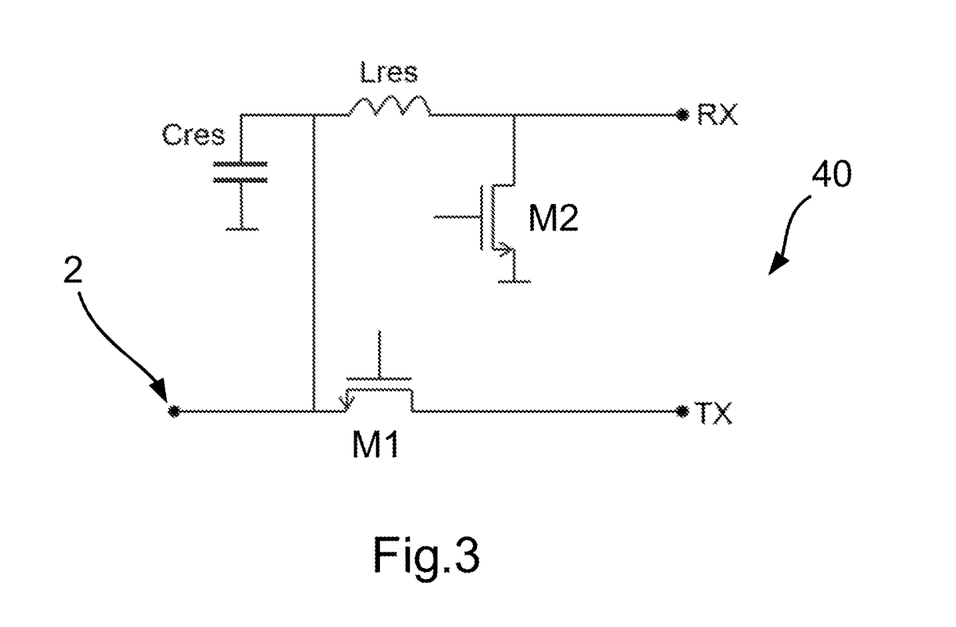
FIG. 3 shows an antenna switch circuit according to an embodiment of this disclosure.

FIG. 3 shows an antenna switch circuit 40 according to an embodiment of this disclosure. The antenna switch circuit 40 may be a Single Pole Double Throw (SPDT) switch. The antenna switch circuit 40 may be used to implement the antenna switch circuit 32 described above in relation to FIG. 2.

The antenna switch circuit 40 includes an antenna port 2. The antenna port 2 is couplable to an antenna, for instance an antenna of the kind described above in relation to FIG. 2. As such, the antenna port 2 may be coupled to an antenna via a circulator and filter as in FIG. 2.

The antenna switch circuit 40 also includes a termination port TX. As with the arrangement shown in FIG. 1, the termination port TX in this embodiment is for disposing of a reflected signal received from the antenna in transmit mode, and may be coupled to a resistor such as the (e.g., 50Ω) resistor 27 shown in FIG. 2.

The antenna switch circuit 40 further includes a receive port RX. In this embodiment, the receive port RX is for receiving a signal from the antenna port 2 via the antenna switch circuit 40 in a receive mode.

The antenna switch circuit 40 also includes a first switch M1. The first switch M1 is coupled between the antenna port 2 and the termination port TX.

The antenna switch circuit 40 further includes a resonant inductance. The resonant inductance is coupled between the receive port RX and the node located between the antenna port 2 and the first switch M1. In this embodiment, the resonant inductance comprises an inductance $L_{res}$. The resonant inductance in this embodiment also has a capacitance $C_{res}$, which is coupled between a reference potential (e.g., ground) and the node located between the antenna port 2 and the first switch M1.

The antenna switch circuit 40 also includes a second switch M2. The second switch M2 is coupled between a reference potential (e.g., ground) and a node located between the resonant inductance and the receive port RX.

The first switch M1 and the second switch M2 may each be implemented using one or more transistors (e.g., Metal Insulator Field Effect Transistors (MISFETs)) coupled in series.

The antenna switch circuit 40 is switchable between a transmit mode and a receive mode.

In the transmit mode, both the first switch M1 and the second switch M2 are in an on state. In the context of FIG. 2, during the transmit mode, reflected power from the antenna, arriving at antenna port 2 may be directed through switch M1 to the termination port TX (and from there through a resistor such as the resistor 27 described above). This, together with a high-ohmic impedance of the resonant tank formed by $L_{res}$ and $C_{res}$ seen from the antenna port 2 towards the RX port, can protect components located downstream of the receive port RX from the reflected power and may also protect a power amplifier located upstream of the antenna port from the reflected power.

In the receive mode, both the first switch M1 and the second switch M2 are in an off state. A received signal, arriving at the antenna port 2, may thus be directed to the receive port RX, but is blocked from the termination port TX (by the first switch M1). The received signal is also not diverted to the reference potential (e.g., ground), due to the off state of the second switch M2.

Unlike the antenna switch circuit 10 shown in FIG. 1, the antenna switch circuit of the present embodiment does not include a switch (M3 in FIG. 1) coupled in series between the antenna port 2 and the receive port RX. The omission of this switch can solve at least some of the problems noted above in relation to the antenna switch circuit 10 in FIG. 1. For instance, embodiments of this disclosure may be implemented in bulk technology, owing to the reduced need to provide switches with high breakdown characteristics. This can reduce costs compared to implementations using SOI technology. Moreover, the antenna switch circuit 40 may be made smaller and in a manner having fewer parasitic s compared to an antenna switch circuit of the kind shown in FIG. 1. For instance, the omission of the switch M3 in comparison to the circuit shown in FIG. 1 may also allow a charge pump and large driver associated with that switch to be omitted. Similar considerations to those noted here in respect to the omission of the switch M3 may also apply to the omission of the TX shunt switch (the switch M4 in FIG. 1), which may not be required according to embodiments of this disclosure.

As noted above, in the transmit mode, switches M1 and M2 in the embodiment of FIG. 3 are in an on state. Because of this, the switches M1 and M2 may be required to handle large currents, but not necessarily large voltages across their terminals. In contrast to the voltage handling capabilities (e.g., high breakdown voltage) discussed above, current handling capabilities tend to be associated with fewer trade-offs. In the off state of the switches M1 and M2 (i.e., in receive mode), these switches may only experience voltages associated with received signals (in contrast to the higher powers associated with transmit signals). In particular, the powers associated with received signals may be several orders of magnitude smaller compared to the powers associated with transmit signals (e.g., −10 dBm compared to 47 dBm). Consequently, the breakdown performance of the switches M1 and M2 (in their off state, in the receive mode) may be non-critical. This can enable the use of switches with lower values of the figure of merit $R_{on} \cdot C_{off}$ (where $R_{on}$ is the on state resistance and $C_{off}$ is the off state capacitance of each switch). Transistors implementing such switches may have a shorter channel length.

For thermal constraints of a front end module incorporating the antenna switch circuit 40, the reflected power in the transmit mode may be directed predominantly for disposal through an external (e.g., discrete) resistor 27 (e.g., 50Ω) of the kind described above in relation to FIG. 2. Consequently, the receive path (including e.g., $L_{res}$, $C_{res}$ and the switch M2 in on state) in the transmit mode, looking from the antenna, may be made high-ohmic. This can be implemented using the resonant inductance. The resonant inductance may form a $L_{res}$-$C_{res}$ tank, which is in parallel resonance at the desired frequency. The values of $L_{res}$ and $C_{res}$ may be chosen to meet this resonance condition, in accordance with a given application. For instance, when $C_{res}$ is an explicit component, it may be seen as adding an amount of extra capacitance, to the resonant inductance, required to meet the resonance condition.

The resonant inductance $L_{res}$ may, for instance, be implemented using bond wires, laminate tracks, or planar coils in or on an integrated circuit (IC) incorporating one or more semiconductor dies. The capacitance $C_{res}$ may, for instance, be formed by package or IC parasitics, the finite self-resonance of $L_{res}$, or explicit capacitors (e.g., fringe or Metal Insulator Metal (MIM)) located on or in an IC incorporating one of more semiconductor dies. From this discussion, it will be appreciated that in some embodiments, $C_{res}$ may be viewed is being formed as an intrinsic factor of the inductance $L_{res}$, while in other embodiments, $C_{res}$ may be provided separately (e.g., to "top up" the capacitance of $L_{res}$ to meet the aforementioned resonance condition for a given application). When $C_{res}$ is provided separately, this may be included as part of the native characteristics of an IC incorporating the antenna switch circuit 40 (e.g., in the case of the parasitics as noted above) or as an explicit separate component (e.g., in the case of the fringe or MIM capacitors noted above).

For the various implementations of $L_{res}$ and $C_{res}$, it is noted that the associated losses and hence Q factors may apply. For instance, a bond wire, which may have a Q factor of 40-50 is generally much higher than may be achieved using on-chip coils at (which may have a Q factor of ~20). Laminate tracks may have a Q factor that is intermediate the Q factors achievable using a bond wire and an on-chip coil. Similarly, separate capacitors may have a factor of around 80-100, but the self-resonance capacitor of $L_{res}$ may still be exploited to avoid all resonant current having to pass through the (RX shunt) second switch M2.

Various implementations of the resonant inductance and the manner in which it may be incorporated into one or more semiconductor dies will now be described in relation to FIGS. 4 to 6. In particular, various ways in which $L_{res}$ and $C_{res}$ may be partitioned across one or more semiconductor dies will be presented.

Figure 4:
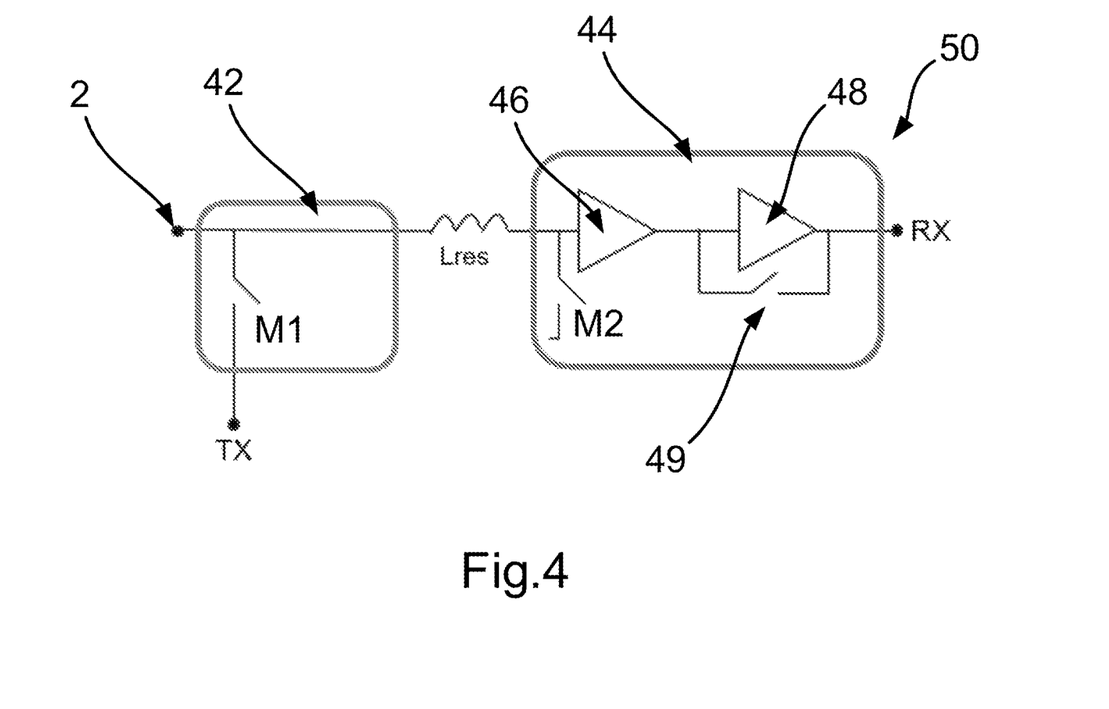
FIG. 4 shows a circuit according to an embodiment of this disclosure.

FIG. 4 shows circuit 50 according to an embodiment of this disclosure. The antenna switch circuit 40 may be used to implement the antenna switch circuit 32 and components of the front end module 30 described above in relation to FIG. 2.

The circuit 50 in FIG. 4 includes an antenna port 2, a termination port TX, a receive port RX, a first switch M1 and a second switch M2 as described above in relation to FIG. 3. The circuit 50 also includes a resonant inductance. In the present embodiment, no explicit capacitance $C_{res}$ is included, and $C_{res}$ may be considered by being formed at least partly by the finite self-resonance of $L_{res}$. Nevertheless, it is envisaged that an explicit separate capacitance may be proved to "top up" $C_{res}$ if required for a given application. It is also envisaged that additional contributions to $C_{res}$ may be provided by package or IC parasitics.

The circuit 50 in FIG. 4 also includes an amplifier stage of the kind described above in relation to FIG. 2. As explained previously, the amplifier stage may include one or more low noise amplifiers 46, 48, and an optional bypass switch 49. As explained previously, the gain provided by the low noise amplifiers 46, 48 may be programmable, e.g., using the bypass switch 49 and or an optional digital step attenuator (not shown in FIG. 4).

In the embodiment of FIG. 4, the first switch M1, which is provided in series in the termination path, is provided in a first semiconductor die 42, while the second switch M2, which acts as a receive shunt switch, is provided on a second semiconductor die 44. The features of the amplifier stage may also be provided on the second semiconductor die 44. In this embodiment, the connection between the first semiconductor die 42 and the second semiconductor die 44 may be exploited to form $L_{res}$. In particular, the interconnect forming $L_{res}$ may comprise one or more bond wires or laminate tracks in a laminate-based package, as described above.

Figure 5:
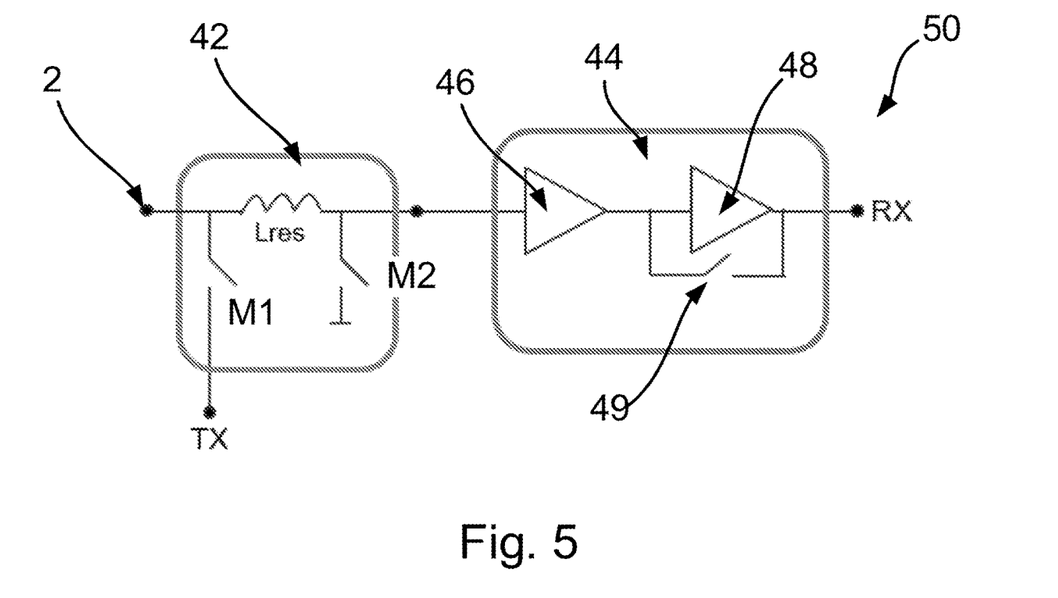
FIG. 5 shows a circuit according to an embodiment of this disclosure.

FIG. 5 shows circuit 50 according to another embodiment of this disclosure. The antenna switch circuit 40 may be used to implement the antenna switch circuit 32 and components of the front end module 30 described above in relation to FIG. 2.

The circuit 50 in FIG. 5 includes an antenna port 2, a termination port TX, a receive port RX, a first switch M1 and a second switch M2 as described above in relation to FIG. 3. The circuit 50 also includes a resonant inductance. In the present embodiment, no explicit capacitance $C_{res}$ is included, and $C_{res}$ may be considered by being formed partly by the finite self-resonance of $L_{res}$. Nevertheless, it is envisaged that an explicit separate capacitance may be proved to "top up" $C_{res}$ if required for a given application. It is also envisaged that additional contributions to $C_{res}$ may be provided by package or IC parasitics.

The circuit 50 in FIG. 5 also includes an amplifier stage of the kind described above in relation to FIG. 2. As explained previously, the amplifier stage may include one or more low noise amplifiers 46, 48, and an optional bypass switch 49. As explained previously, the gain provided by the low noise amplifiers 46, 48 may be programmable, e.g., using the bypass switch 49 and or an optional digital step attenuator (not shown in FIG. 5).

In the embodiment of FIG. 5, the first switch M1, which is provided in series in the termination path, and the second switch M2, which acts as a receive shunt switch, are both provided in a first semiconductor die 42. In this embodiment, the features of the amplifier stage may be provided on a second semiconductor die 44

In this embodiment, since the resonant inductor $L_{res}$ is placed between two already available pins (e.g., ANT and SWOUT) of the first semiconductor die, it may be implemented (without extra pins) in any of the ways mentioned above (bond wire, laminate track or on-chip coil). Furthermore, the second semiconductor die 44 incorporating the amplifier stage may now be placed close to the first semiconductor die, because the connection between the first semiconductor die 42 and second semiconductor die 44 is not constrained by the need to form $L_{res}$ as in FIG. 4. The arrangement of FIG. 5 may thus allow for a more compact construction.

Figure 6:
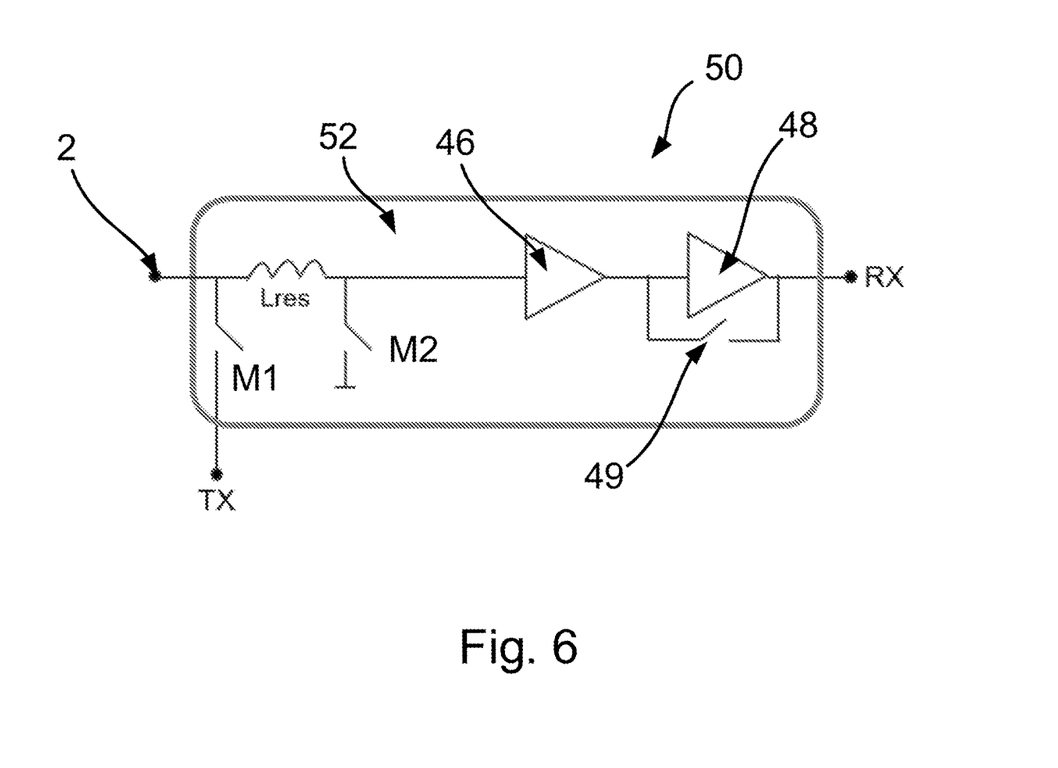
FIG. 6 shows a circuit according to an embodiment of this disclosure.

FIG. 6 shows circuit 50 according to a further embodiment of this disclosure. The antenna switch circuit 40 may be used to implement the antenna switch circuit 32 and components of the front end module 30 described above in relation to FIG. 2.

The circuit 50 in FIG. 6 includes an antenna port 2, a termination port TX, a receive port RX, a first switch M1 and a second switch M2 as described above in relation to FIG. 3. The circuit 50 also includes a resonant inductance. In the present embodiment, no explicit capacitance $C_{res}$ is included, and $C_{res}$ may be considered by being formed at least partly by the finite self-resonance of $L_{res}$. Nevertheless, it is envisaged that an explicit separate capacitance may be proved to "top up" $C_{res}$ if required for a given application.

It is also envisaged that additional contributions to $C_{res}$ may be provided by package or IC parasitics.

The circuit 50 in FIG. 6 also includes an amplifier stage of the kind described above in relation to FIG. 2. As explained previously, the amplifier stage may include one or more low noise amplifiers 46, 48, and an optional bypass switch 49. As explained previously, the gain provided by the low noise amplifiers 46, 48 may be programmable, e.g., using the bypass switch 49 and or an optional digital step attenuator (not shown in FIG. 6).

In the embodiment of FIG. 6, the first switch M1, which is provided in series in the termination path, and the second switch M2, which acts as a receive shunt switch, as well as the features of the amplifier stage, are all provided on the same semiconductor die 52. The embodiment of FIG. 6 may thus provide a monolithic solution, appreciating that the resonant Single Pole Double Throw (SPDT) topology allows for cost-effective technology to be used, for example the one already used to design dies incorporating amplifier stages of the kind described above in relation to FIG. 2 (e.g., SiGe technology).

Figure 7:
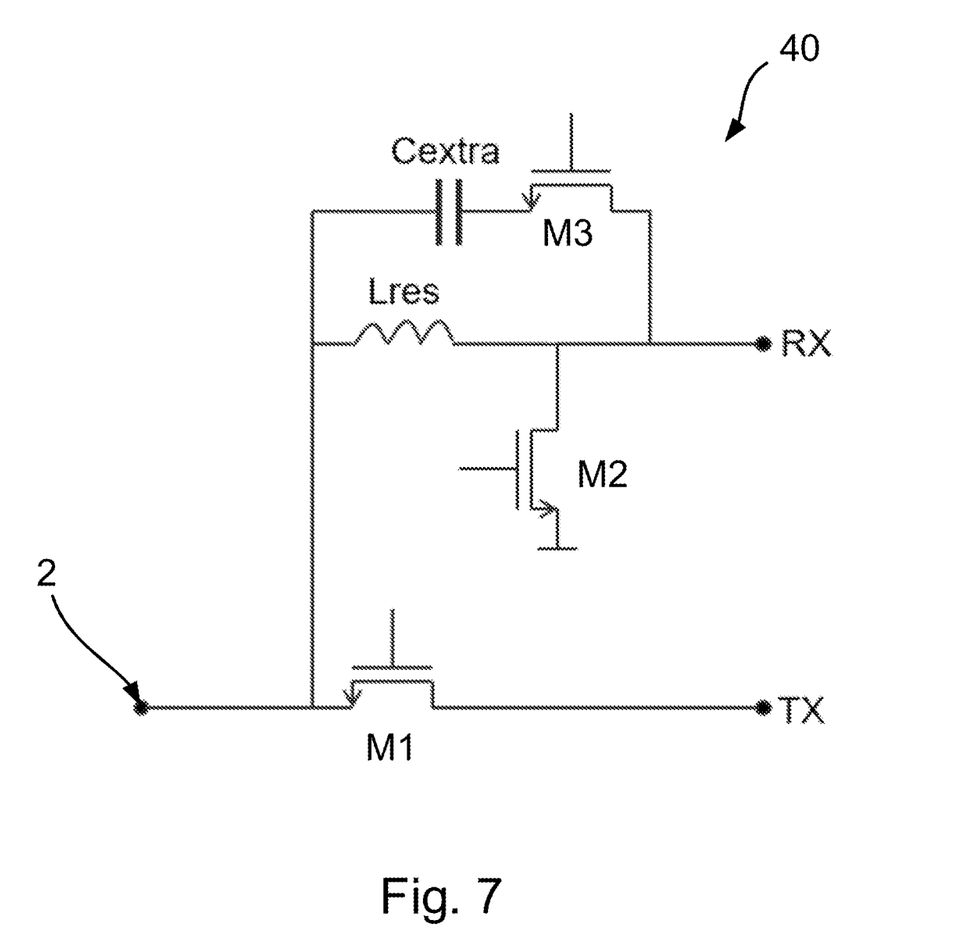
FIG. 7 shows an antenna switch circuit according to an embodiment of this disclosure.

FIG. 7 shows an antenna switch circuit 40 according to another embodiment of this disclosure. The antenna switch circuit 40 may be used to implement the antenna switch circuit 32 described above in relation to FIG. 2.

The embodiment of FIG. 7 is similar in some respects to the embodiment of FIG. 3, and only the significant differences will be described below in detail.

In FIG. 7, the antenna switch circuit 40 includes a series coupled capacitance $C_{extra}$ and third switch M3. The series coupled capacitance $C_{extra}$ and third switch M3 are coupled in parallel with the resonant inductance $L_{res}$. In the transmit mode, the third switch M3 is switched to an on state, whereas in the receive mode, the third switch M3 is switched to an off state. The capacitance of the series coupled capacitance $C_{extra}$ may be programmable.

In the transmit mode, with M3 switched on, $C_{extra}$ may be used to add extra capacitance to the resonant inductor $L_{res}$, thereby allowing the aforementioned resonance condition to be met in some embodiments. Conversely, in the receive mode, the switch M3 may be switched to an off state, so the received signal may be routed to the receive port RX along a path that excludes $C_{extra}$.

In the present embodiment, part of the resonance current may either pass through M3 or M2, not through both of them. Arguably therefore the programmability of the extra capacitance, with its potential benefits in the receive mode—may be achieved without extra losses as would be the case when a switch is added in series with $C_{res}$ in the embodiment of FIG. 3. It is also envisaged that the programmability of $C_{res}$, using $C_{extra}$, may also enable programmability of the frequency band of interest for the signals passing through the antenna switch circuit 40, either in our factories for calibration or at the customer for serving different frequency bands.

Figure 8A:
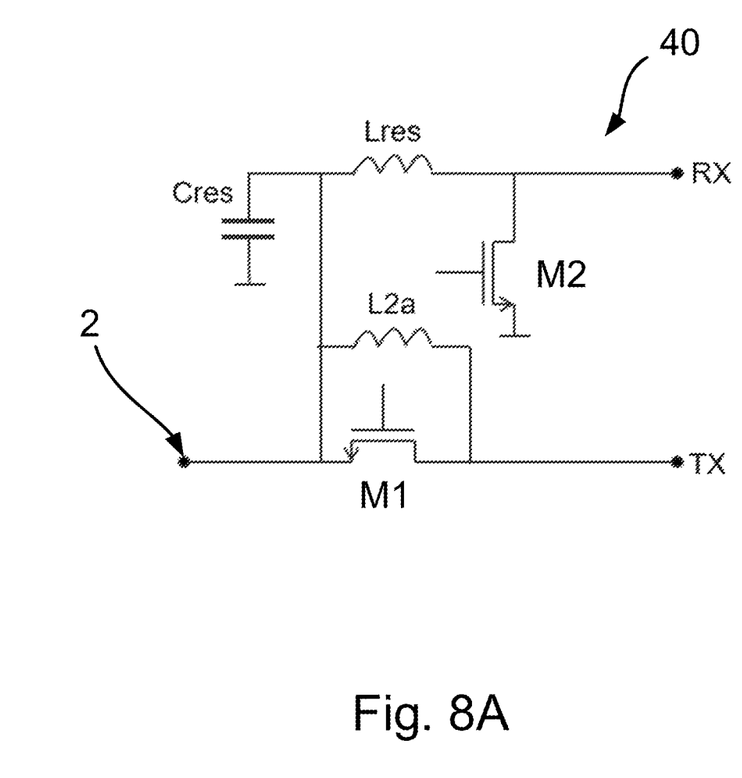
FIGS. 8A and 8B each show an antenna switch circuit according to an embodiment of this disclosure.
Figure 8B:
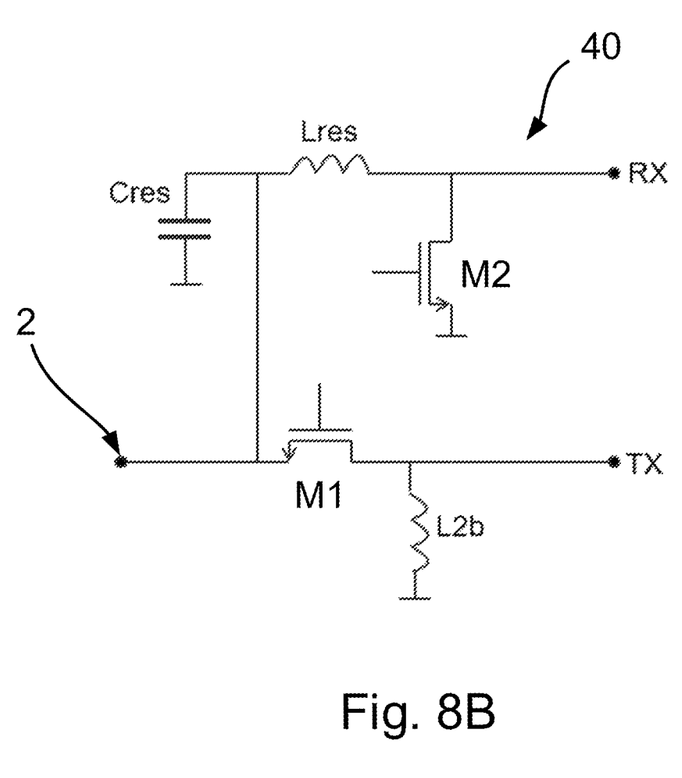

FIGS. 8A and 8B each show an antenna switch circuit 40 according to a further embodiment of this disclosure. The antenna switch circuit 40 may be used to implement the antenna switch circuit 32 described above in relation to FIG. 2.

The embodiments of FIGS. 8A and 8B are similar in some respects to the embodiment of FIG. 3, and only the significant differences will be described below in detail.

In FIG. 8A, a further inductance L2a is coupled in parallel with the first switch M1. In FIG. 8B, a further inductance L2b is coupled between a reference potential (e.g., ground) and a node located between the termination port TX and the first switch M1. It is envisaged that the further inductances L2a, L2b used in FIGS. 8A and 8B may be combined, such that both further inductances L2a and L2b are present in the same antenna switch circuit 40.

The further inductances L2a and L2b may be used optionally to compensate for the absence of a TX shunt switch (such as the switch M4 in FIG. 1), in a manner similar to the use of the resonant inductor $L_{res}$ in the absence of the switch M3 in FIG. 1. The further inductances L2a, L2b may enhance isolation and return losses.

In transmit mode, in the context of FIG. 2, it is typically required that the characteristic impedance seen at the antenna port 2 and the termination port TX has a defined value (e.g., 50Ω). A switch M1 with relatively small on-resistance (e.g., 2Ω) may enable this. In the receive mode typically, this same impedance level (e.g., 50Ω) is still required at the antenna port, but there is freedom at the receive port RX. Embodiments of this disclosure may naturally, in the receive mode, enable an inductive impedance at the receive port RX, which may be beneficial for a low noise figure design of the low noise amplifier(s) of the amplifier stage. Alternatively, also a real impedance at the receive port RX in the receive mode can be designed by dimensioning the transmission path as a λ/4, (i.e., one or more shuntC—seriesL—shuntC (CLC) sections with the resonant inductance and resonant/parasitic capacitors).

Embodiments of this disclosure may include a front end module of the kind described above, incorporating an antenna switch circuit of the kind described above. The front end module may, for instance, be included in a base station (e.g., for wireless/mobile communications). The front end module may, for instance, be included in a wireless local area network, "WLAN" device.

An antenna circuit switching method according to an embodiment of this disclosure may include providing an antenna switch circuit of the kind described above in relation to any of FIGS. 2 to 8 and switching the antenna switch circuit between its transmit mode and receive mode.

Accordingly, there has been described an antenna switch circuit and an antenna circuit switching method. The circuit includes an antenna port, a termination port (e.g., for disposal of power reflected back from an antenna and received through the antenna port in a transmit mode), and a receive port (e.g., for receiving a signal from the antenna port via the antenna switch circuit in a receive mode). The circuit also includes a first switch coupled between the antenna port and the termination port. The circuit further includes a resonant inductance coupled between the receive port and the node located between the antenna port and the first switch. The circuit also includes a second switch coupled between a reference potential and a node located between the resonant inductance and the receive port.

Although particular embodiments of this disclosure have been described, it will be appreciated that many modifications/additions and/or substitutions may be made within the scope of the claims.

The invention claimed is:

1. An antenna switch circuit comprising:
   an antenna port;
   a termination port;
   a receive port;
   a first switch coupled between the antenna port and the termination port;
   a resonant inductance having a first terminal connected to the receive port and a second terminal connected to a node located between the antenna port and the first switch;

a second switch coupled between a reference potential and a node located between the resonant inductance and the receive port; and a series coupled capacitance and third switch that are coupled in parallel with the resonant inductance, wherein the antenna switch circuit is switchable between:

a transmit mode in which each of the first switch, the second switch, and the third switch are in an on state; and a receive mode in which each of the first switch, the second switch, and the third switch are in an off state.

2. The antenna switch circuit of claim 1, wherein:

the termination port is for disposal of power reflected back from an antenna and received through the antenna port in the transmit mode; and the receive port is for receiving a signal from the antenna port via the antenna switch circuit in the receive mode.

3. The antenna switch circuit of claim 1, wherein the first switch is located in a first semiconductor die and the second switch is located in a second semiconductor die, wherein the first semiconductor die is electrically connected to the second semiconductor die by an interconnect and wherein the inductance is a partial inductance of the interconnect.

4. The antenna switch circuit of claim 3, wherein the interconnect comprises:

one or more bond wires; or a laminate track.

5. The antenna switch circuit of claim 3, wherein the second semiconductor die further comprises an amplification stage, wherein an input of the amplification stage is coupled to the node located between the inductance and the receive port, and wherein an output of the amplification stage is coupled to the receive port.

6. The antenna switch circuit of claim 1, wherein the first switch and the second switch are both located on a first semiconductor die and wherein the inductance is the inductance of:

a bond wire, or a laminate track or a planar coil formed on a surface of the semiconductor die.

7. The antenna switch circuit of claim 6, comprising a second semiconductor die comprising an amplification stage, wherein an input of the amplification stage is coupled to the node located between the inductance and the receive port, and wherein an output of the amplification stage is coupled to the receive port.

8. The antenna switch circuit of claim 6, wherein the first semiconductor die further comprises an amplification stage, wherein an input of the amplification stage is coupled to the node located between the inductance and the receive port, and wherein an output of the amplification stage is coupled to the receive port.

9. The antenna switch circuit of claim 1, wherein the capacitance is programmable.

10. A front end module comprising an antenna switch circuit comprising:

an antenna port;

a termination port;

a receive port;

a first switch coupled between the antenna port and the termination port;

a resonant inductance having a first terminal connected to the receive port and a second terminal connected to a node located between the antenna port and the first switch;

a second switch coupled between a reference potential and a node located between the resonant inductance and the receive port; and a series coupled capacitance and third switch that are coupled in parallel with the resonant inductance, wherein the antenna switch circuit is switchable between:

a transmit mode in which each of the first switch, the second switch, and the third switch are in an on state; and a receive mode in which each of the first switch, the second switch, and the third switch are in an off state.

11. The front end module of claim 10, wherein:

the termination port is for disposal of power reflected back from an antenna and received through the antenna port in the transmit mode; and the receive port is for receiving a signal from the antenna port via the antenna switch circuit in the receive mode.

12. The front end module of claim 10, wherein the first switch is located in a first semiconductor die and the second switch is located in a second semiconductor die, wherein the first semiconductor die is electrically connected to the second semiconductor die by an interconnect and wherein the inductance is a partial inductance of the interconnect.

13. An antenna circuit switching method comprising:

providing an antenna switch circuit comprising:

an antenna port;

a termination port;

a receive port;

a first switch coupled between the antenna port and the termination port;

a resonant inductance having a first terminal connected to the receive port and a second terminal connected to a node located between the antenna port and the first switch;

a second switch coupled between a reference potential and a node located between the resonant inductance and the receive port; and a series coupled capacitance and third switch that are coupled in parallel with the resonant inductance; and switching the antenna switch circuit between:

a transmit mode in which each of the first switch, the second switch, and the third switch are in an on state; and a receive mode in which each of the first switch, the second switch, and the third switch are in an off state.

14. The antenna circuit switching method of claim 13, wherein:

the termination port disposes of power reflected back from an antenna and received through the antenna port in the transmit mode; and the receive port receives a signal from the antenna port via the antenna switch circuit in the receive mode.

15. The antenna circuit switching method of claim 13, wherein the first switch is located in a first semiconductor die and the second switch is located in a second semiconductor die, wherein the first semiconductor die is electrically connected to the second semiconductor die by an interconnect and wherein the inductance is a partial inductance of the interconnect.

* * * * *